(12) United States Patent
Young et al.

(10) Patent No.: US 7,818,307 B1
(45) Date of Patent: Oct. 19, 2010

(54) SYSTEM AND METHOD OF PROVIDING ELECTRONIC ACCESS TO ONE OR MORE DOCUMENTS

(75) Inventors: Rita Marie Young, San Antonio, TX (US); Darrin Keith Wylie, San Antonio, TX (US); Dale Alan Wagner-Krankel, San Antonio, TX (US); Dwayne Lamarr Bess, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 402 days.

(21) Appl. No.: 11/044,145

(22) Filed: Jan. 27, 2005

Related U.S. Application Data (63) Continuation of application No. 10/280,764, filed on Oct. 25, 2002, now Pat. No. 6,877,136.

(51) Int. Cl.
*G06F 7/00* (2006.01)
(52) U.S. Cl. .................. 707/705; 707/736; 707/781
(58) Field of Classification Search .............. 707/1, 707/9, 10, 101, 104.1; 709/201
See application file for complete search history.

(56) References Cited

U.S. PATENT DOCUMENTS

| | | | |
|---|---|---|---|
| 6,009,442 A * | 12/1999 | Chen et al. ............... 715/205 |
| 6,222,541 B1 * | 4/2001 | Bates et al. .............. 715/786 |
| 6,236,990 B1 * | 5/2001 | Geller et al. ................. 707/5 |
| 6,334,130 B1 * | 12/2001 | Tada et al. .................... 707/9 |
| 6,493,760 B1 * | 12/2002 | Pendlebury et al. ......... 709/229 |
| 6,560,620 B1 * | 5/2003 | Ching ..................... 715/511 |
| 6,584,466 B1 * | 6/2003 | Serbinis et al. ............. 707/10 |
| 6,778,972 B2 * | 8/2004 | Leonardos .................... 707/1 |
| 6,825,849 B1 * | 11/2004 | Minakuchi et al. .......... 345/581 |
| 6,968,363 B1 * | 11/2005 | Mulvey .................... 709/217 |
| 7,016,865 B1 * | 3/2006 | Weber et al. ................ 705/26 |
| 7,299,408 B1 * | 11/2007 | Daconta et al. ............ 715/234 |
| 7,305,713 B1 * | 12/2007 | Crance ...................... 726/33 |
| 7,512,810 B1 * | 3/2009 | Ryan ........................ 713/189 |

(Continued)

OTHER PUBLICATIONS

Thoma et al., A Prototype System for the Electronic Storage and Retrieval of Document Images, Jul. 1985, ACM Press, vol. 3, Issue 3, pp. 279-291.*

(Continued)

*Primary Examiner*—Apu M Mofiz
*Assistant Examiner*—Jessica N Le
(74) *Attorney, Agent, or Firm*—Brooks, Cameron & Huebsch, PLLC (57) ABSTRACT

The present invention provides a system and method of providing electronic access to one or more documents. In one embodiment, a storage device retains eligibility information relating to each document. Eligibility information provides the system with information such as the document type, the applicable line of business, governmental regulations, time sensitive information, and security requirements. If a given document is determined to be eligible, the processing unit of the present invention retrieves one or more preference instructions provided by the customer. The preference instructions are reviewed to confirm 1) whether the customer has authorized electronic access to a given document and 2) the mode of electronic transmission favored by the customer. In one embodiment, the present invention is connected to a computer network such that the customer may be provided electronic access to his or her documents through a web interface.

33 Claims, 4 Drawing Sheets

U.S. PATENT DOCUMENTS

| | | | |
|---|---|---|---|
| 2002/0019837 A1* | 2/2002 | Balnaves | 707/512 |
| 2002/0093528 A1* | 7/2002 | Grainger | 345/738 |
| 2002/0116415 A1* | 8/2002 | Dutta et al. | 707/516 |
| 2002/0123999 A1* | 9/2002 | Bankert et al. | 707/10 |
| 2002/0165925 A1* | 11/2002 | Hamilton et al. | 709/213 |
| 2002/0178190 A1* | 11/2002 | Pope et al. | 707/530 |
| 2002/0198784 A1* | 12/2002 | Shaak et al. | 705/26 |
| 2004/0024769 A1* | 2/2004 | Forman et al. | 707/100 |
| 2004/0088313 A1* | 5/2004 | Torres | 707/101 |
| 2004/0215729 A1* | 10/2004 | Kuwata et al. | 709/207 |
| 2004/0220997 A1* | 11/2004 | De Saint-Johns | 709/201 |
| 2005/0015338 A1* | 1/2005 | Lee | 705/40 |
| 2005/0289182 A1* | 12/2005 | Pandian et al. | 707/104.1 |
| 2006/0080316 A1* | 4/2006 | Gilmore et al. | 707/9 |
| 2006/0122956 A1* | 6/2006 | Shimogori | 707/1 |

OTHER PUBLICATIONS

M. A. Plank, Full Text Retrieval of Documents Identified in On-Line Library Catalogs via Internet, Oct. 1989, ACM, pp. 311-312.*

* cited by examiner

SYSTEM AND METHOD OF PROVIDING ELECTRONIC ACCESS TO ONE OR MORE DOCUMENTS

CROSS REFERENCE TO RELATED APPLICATIONS

This application claims priority to and is a continuation of co-assigned and co-pending U.S. patent application Ser. No. 10/280,764, filed Oct. 25, 2002, by Bess et al., entitled SYSTEM AND METHOD OF PROVIDING ELECTRONIC ACCESS TO ONE OR MORE DOCUMENTS, which is incorporated herein by reference and claims priority to a co-assigned U.S. Provisional Patent Application Ser. No. 60/339,345, filed Oct. 26, 2001, by Bess et al., entitled ELECTRONIC DOCUMENT DELIVERY.

FIELD OF THE INVENTION

The present invention relates generally to a document manipulation system and, more particularly, to a system and method of providing electronic access to one or more documents.

BACKGROUND OF THE INVENTION

As computers have become indispensable in our day-to-day activities, the advantages of storing information electronically have steadily increased. One of the primary advantages of electronically stored information is its inherent versatility. For example, editing and exchanging electronic information is greatly simplified as compared to editing and exchanging documents stored in paper form only. Furthermore, any advantage attributable to having a physical document is retained in electronic storage because a "hard copy" of an electronic document may be readily produced from the electronic version.

Another significant advantage of electronically stored documents is that of providing enhanced access to information. Over the past few years, the improved access offered by electronic documents has become so important that many organizations expend substantial resources in scanning paper documents to store them electronically.

Routine facsimile transmission further exemplifies the value of electronic access to documents. Arguably, it is access to information that fuels what many refer to as the Information Age.

Today, perhaps the most prominent example of access to electronically stored information is the Internet. Literally millions of people depend on the Internet for email, banking, investing, shopping, news, entertainment, and social interaction. Not too many years ago, sharing information over the Internet was principally the domain of academicians and scientists. For members of the general public, the technical nature of Internet access tools and the prohibitive computer hardware requirements meant virtual anonymity for the Internet. However, the advent of hypertext navigation and the World Wide Web ("Web"), in conjunction with modestly priced and increasingly powerful personal computers, has propelled the Internet to the forefront of public attention and has made the Internet an indispensable source of information.

Unfortunately, providing electronic access to documents is not always a straightforward process. Governmental regulations, increased security concerns and customer preferences, to name a few, play a major role in determining what documents may be disseminated electronically.

Thus, there remains a need for a system and method of providing electronic access to one or more documents capable of determining which documents are eligible for electronic access and providing such documents in a manner consistent with the individual preferences of the consumer.

SUMMARY OF THE INVENTION

Accordingly, the present invention provides a system and method of providing electronic access to one or more documents. The present invention provides a processing unit coupled to one or more storage devices capable of retaining electronic data.

Documents for which electronic access is desirable are examined to determine eligibility. In one embodiment, the storage device of the present invention retains eligibility information relating to each document. Eligibility information provides the system with information such as the document type, the applicable line of business, governmental regulations, time sensitive information, and security requirements.

The present invention allows this information to be searched for any given document to determine whether the document may be accessed electronically. If a given document is determined to be eligible, the processing unit of the present invention retrieves one or more preference instructions provided by the customer. In one embodiment, preference instructions are stored upon a storage device coupled to the processing unit of the present invention. The preference instructions are reviewed to confirm 1) whether the customer has authorized electronic access to a given document and 2) the mode of electronic transmission favored by the customer.

In one embodiment, the present invention is connected to a computer network. Thus, the customer may access documents electronically through a web interface provided over a computer network. In one embodiment of the present invention, the customer is notified when a document has been provided for electronic access. Thus, the customer is kept informed of the status of his or her documents.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

The present invention is herein described as a method of providing electronic access to one or more documents and as a computer system for providing electronic access to one or more documents.

Figure 1:
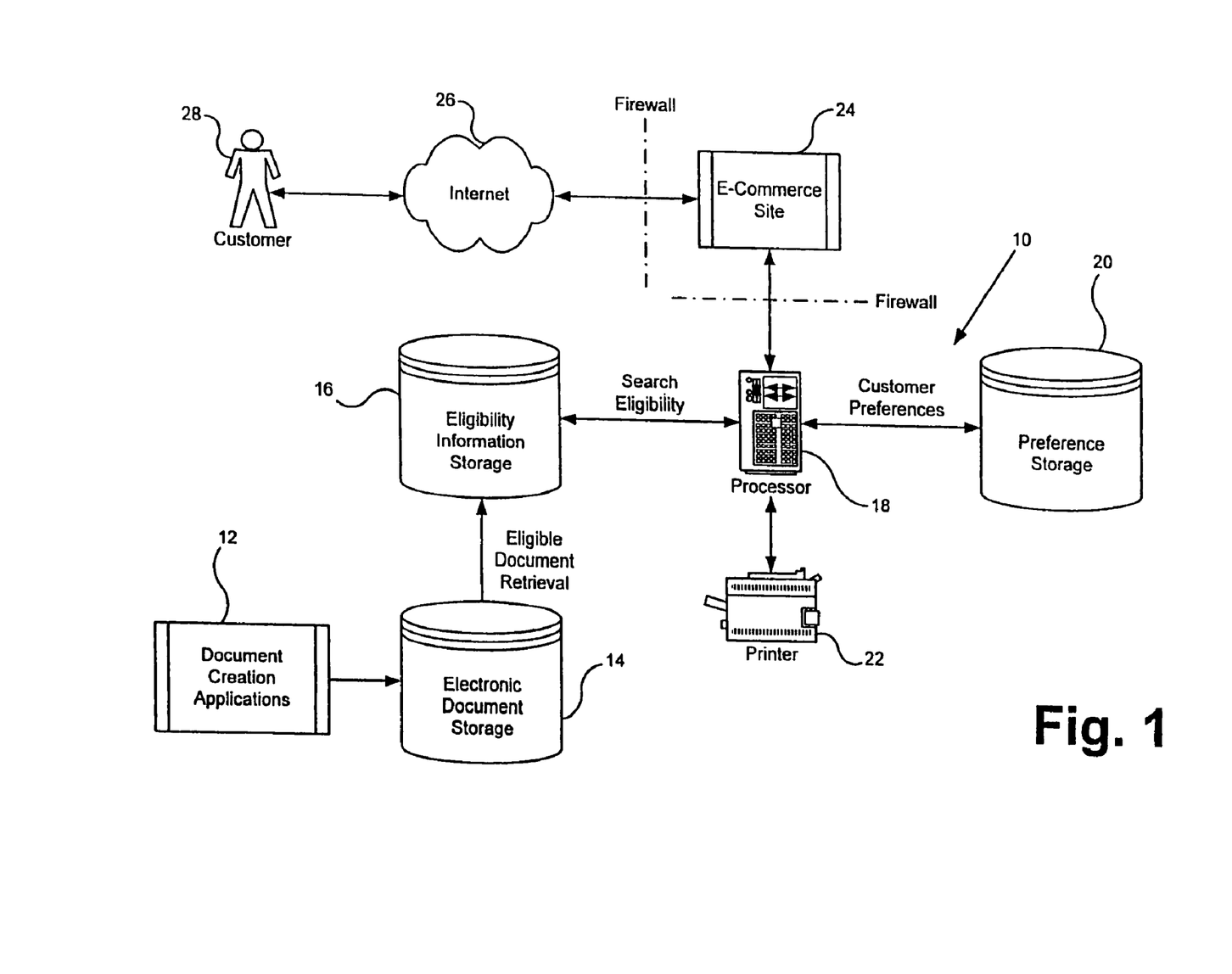
FIG. 1 is a component diagram of one embodiment of the present invention.

Referring to FIG. 1, the computer system 10 of the present invention provides one or more document applications 12 capable of creating electronic documents. A number of known document creation systems working in conjunction with an acceptable platform (not shown) may be utilized to create electronic documents for use by the present invention. In one embodiment, a document creation application designed by IBM® is utilized.

Documents may be created "from scratch" or scanned and transformed into electronic format from hard copy documents. Regardless of the origination of the electronic document, each document is stored upon a document storage 14 for later use.

To accomplish this, the present invention provides a storage device 16 capable of storing and maintaining electronic data. In one embodiment, the storage device 16 is populated with eligibility information relating to each electronic document held upon the document storage 14. Specifically, the eligibility information provides specific guidelines for determining which documents may be provided electronically.

The present invention provides a processing unit 18 for searching eligibility information held upon the storage device 16 and determining which electronic documents are eligible for electronic access. The processing unit of the present invention is electronically coupled to the eligibility information storage device 16 and document storage 14 such that information may pass therebetween.

In one embodiment, the eligibility information held upon the storage device 16 may be divided into one or more categories. First, the content of each document may be utilized to determine eligibility. Various document types including, but not limited to, notices, warnings, solicitations, invoices and incentives, may have specific requirements that must be adhered to prior to providing access to the recipient. Second, the line of business at issue, i.e., financial transactions, insurance, etc., may have relevant industry standards applicable to the question of electronic access.

Third, document eligibility may be affected by security requirements. To illustrate, if electronic access over a computer network is desirable, the recipient must furnish the proper password or other minimum security threshold to gain access. If he or she fails to do so, the document will be ineligible for electronic access.

In one embodiment of the present invention, a fourth category of eligibility information comprises one or more legal requirements. Each document may be subject to legal or regulatory requirements affecting how a document may be presented to a recipient. For example, some states' insurance liability cards are required to be printed on a specific type of bond paper. This legal requirement allows inspecting police officers to immediately determine the authenticity of an individual's insurance card. Unfortunately, this regulatory requirement also prohibits the presentation of these insurance cards to a recipient via electronic means.

A fifth category of eligibility information comprises time sensitive information. The relevant age of an electronic document may be important to determining whether electronic access is available. For example, many documents are time sensitive and must be updated with new information periodically. Thus, in one embodiment, "stale" documents not updated with current information may be ineligible for electronic access.

Finally, documents may be categorized according to privacy constraints. Certain documents may not be shared with third parties without the consent of the individual to whom the document pertains, e.g., medical records. Thus, electronic access to one or more electronic documents may be denied in lieu of privacy concerns or due to lack of the required consent.

Figure 2:
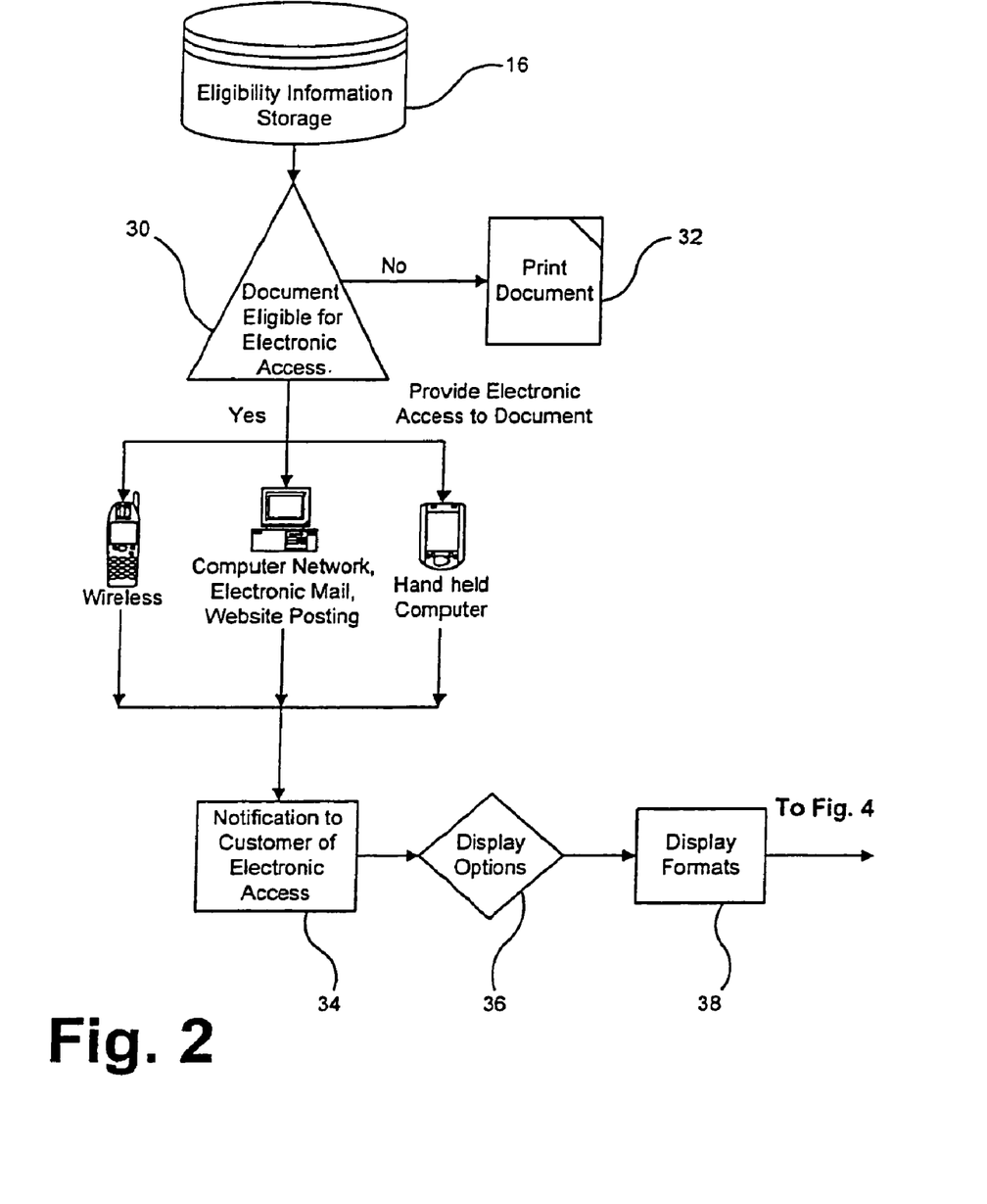
FIG. 2 is a process flow diagram illustrating the electronic access process of one embodiment of the present invention.
Figure 3:
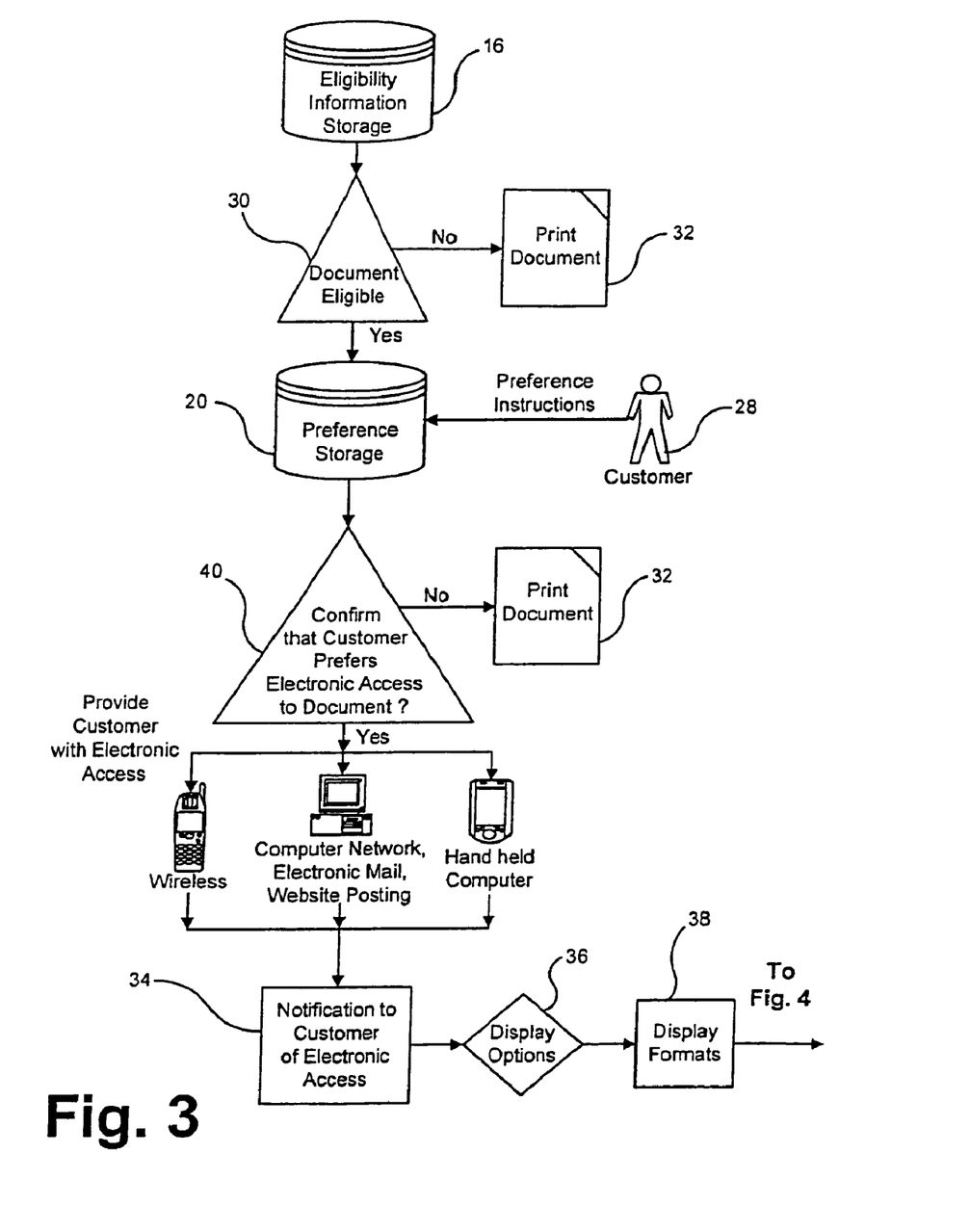
FIG. 3 is a process flow diagram illustrating the electronic access process of one embodiment of the present invention utilizing customer preferences.

Referring to FIGS. 1, 2, and 3, in one embodiment of the present invention, a user 28 may access the e-commerce site 24 of the present invention such that he or she may electronically communicate with the processing unit 18. Once the user's identity is confirmed, the processing unit of the present invention determines which documents stored upon the document storage 14 may be accessible to the user 28. Once the identity of such documents has been determined, the eligibility for electronic access of each document is determined, as illustrated by Box 30. In one embodiment, this is accomplished by searching the eligibility information pertaining to the documents stored upon the storage device 16.

For example, Document "A" is described as a financial services invoice accessible only by an individual possessing a six-digit password. This document may, in turn, also be regulated by governmental regulation "B," which requires such an invoice to be provided to said individual on bond paper utilizing 12-point font and 1" margins.

In short, each document to which electronic access is desirable may not be eligible. In the above example, Document "A" would not be eligible for electronic access due to the legal requirement of bond paper printing. In one embodiment, the system 10 is capable of printing a hard copy 32 of ineligible documents via a printer 22 electronically coupled to the processing unit 18 of the present invention.

The system is capable of providing the user 28 with electronic access to various documents determined to be eligible. In one embodiment, document content, line of business, security requirements, legal requirements, time sensitivity, and privacy concerns are searched and reviewed in combination to determine document eligibility. In one embodiment, the processing unit of the present invention is electronically coupled to a second storage device 20 designed to store and maintain electronic data relating to each user 28. The system, through a computer network 26 or other communication medium, is capable of receiving customer preferences relating to one or more documents and storing same upon the storage device 20.

In one embodiment, once eligibility of an electronic document is determined, the processing unit 18 of the present invention searches preference storage 20 for preferences relating to the user 28 and the document(s) at issue. In this embodiment of the present invention, customer preferences for each eligible document are searched and confirmed prior to providing electronic access, as illustrated by Box 40.

In one embodiment, preference information and eligibility information may be stored upon a single storage device (not shown). In this manner, eligibility information and customer preferences may be merged into a single electronic data file for convenient searching and retrieval by the processing unit 18.

Electronic access may be provided to the user through a plurality of communication mediums including, but not limited to, a computer network, electronic mail transmission, wireless transmission, satellite transmission, hand-held computer, and facsimile transmission. In one embodiment, the system 10 provides the user 28 with at least one notification indicating that electronic access has been provided, as illustrated by Box 34.

This notification may be transmitted to the user through any known communication medium. In one embodiment, the user 28 is provided an email message notifying him or her that one or more documents has been provided for electronic access. A single notification may provide the user with information pertaining to a plurality of electronic documents. This feature of the present invention ensures that the user 28 does not experience excessive correspondence or "spam" from the document provider.

In one embodiment, the user 28 may gain access to eligible documents by accessing a website 24 and entering a password code. Documents may then be viewed and/or downloaded at the user's convenience. One embodiment of the present invention provides the user with a list of display options for each document, as illustrated by Box 36.

In one embodiment, one of the display options includes a custom summary of one or more documents. This feature of the present invention provides the user with a concise yet informative view of the document with the option to view the entire document at a later time. Further, the present invention allows the user to view the document in non-image type format or image-type format as illustrated by Box 38. To illustrate, electronic documents in non-image type format, such as HTML, may be amended and/or equipped with additional functionality. Further, image type format, often referred to as document type format, may be coded to allow for amendment or additional functionality, if desired.

In one embodiment, electronic documents may contain one or more data links capable of directing the user 28 to other internet addresses or additional functionality. In one embodiment, data links are designed to direct the user to transactional information such as online payment options. The feature of the present invention allows the user not only to review the electronic documents but also to transact business online in a convenient and efficient manner.

In contrast to non-image type format, image type format generally does not contain functionality and does not allow for easy revision. Several examples of image type format include portable document format (PDF), JPG, GIF, Tiff, Bitmap and portable network graphic (PNG). Thus, if the user wishes to print, download, or save a document having an appearance substantially identical to a corresponding hard copy version, if any, the user is given the option to do so via image type formatting.

The electronic documents of the present invention may be equipped with electronic e-signature capability. Specifically, electronic documents in the information age are frequently used to transact business over the internet or other communication media. As a result, electronic documents of the present invention may be populated with transactional information. For such documents, the user need only review and "sign" the pre-populated document to conduct an electronic transaction with the document provider or, in some instances, a third party. In this way, the present invention allows the user to review and utilize electronic documents to transact business, if desired.

Figure 4:
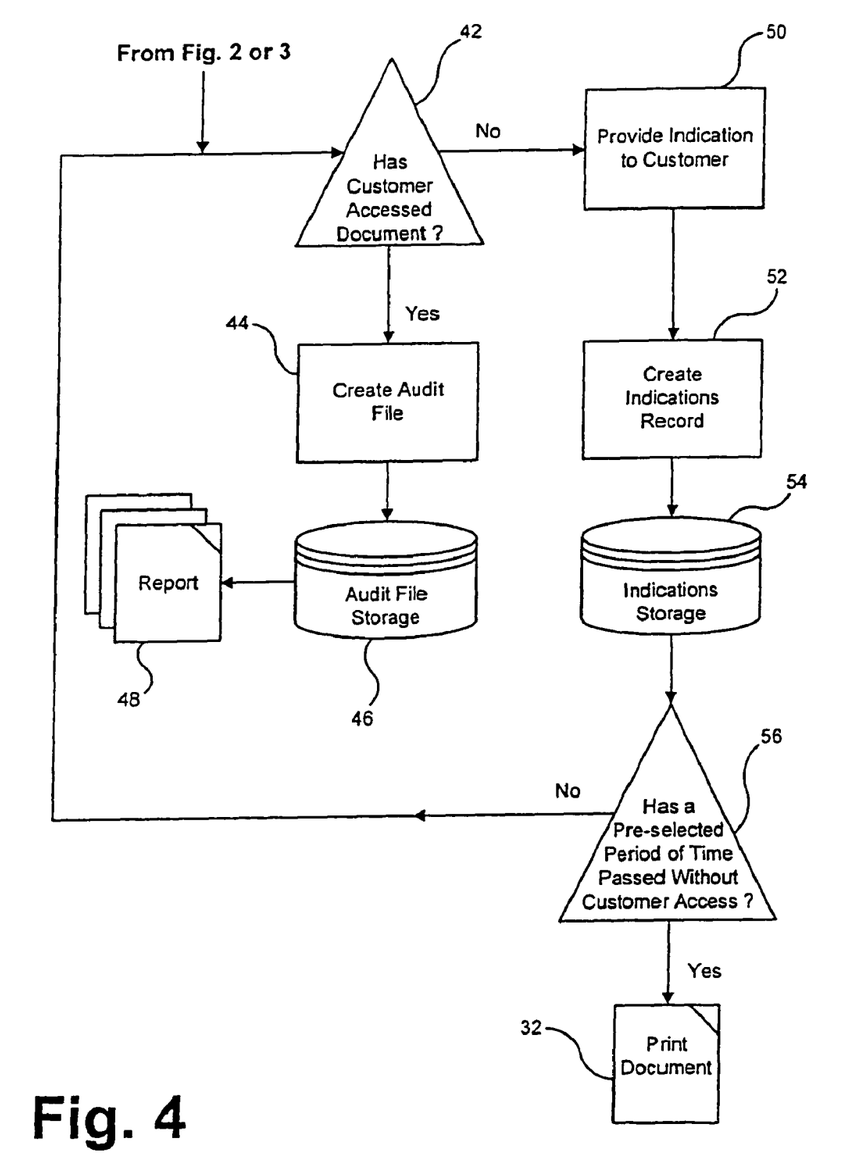
FIG. 4 is a process flow diagram illustrating an audit process of one embodiment of the present invention.

Referring to FIG. 4, the present invention is capable of determining whether document(s) provided electronically have been accessed by the user 28. When the user accesses a document electronically, preferably through a website or other communication media, the processing unit creates one or more audit files as illustrated by Boxes 42 and 44. The audit file contains information relevant to the time and manner by which the user accessed any given electronic document. The audit file is stored within a storage device 36 coupled to the processing unit 18 of the present invention, as illustrated by Box 46. Audit files created by the present invention may be utilized to create comprehensive reports for use by a document provider, customer service representatives, third parties, or the user, as illustrated by Box 48. It should be readily understood that the "user" need not be an external customer. Specifically, the document provider or any third party, subject to privacy and security requirements, may utilize the present invention to obtain and review electronic documents as desired.

In addition to creating and retaining audit records, the present invention is capable of providing the user with one or more indications illustrating which documents have been accessed electronically, as illustrated by Boxes 42, 50, and 52. In one embodiment, the present invention is capable of generating a reminder email for transmission to the user, signaling the printer 22 to provide a hard copy 32 to the user, or creating alert messages such as "you have unopened letters." This feature of the present invention may also be triggered if a pre-selected period of time has passed without customer review of one or more electronic documents, as illustrated by Box 56. Each indication may be stored upon a storage device for later use or further reminders, as illustrated by Box 54.

In one embodiment, the present invention provides a series of indications to the user via a graphic user interface. To illustrate, unopened documents may be highlighted with a red color while opened documents may be highlighted with a green color upon the website 24 utilized by the present invention, it being readily understood that any color scheme or color combination may be utilized by the present invention for this purpose. Further, unopened documents may be automatically displayed in a list or other arrangement above opened documents to encourage the user to open same. Alternatively, unopened documents may be displayed automatically at the bottom of the list or other arrangement relative to opened documents to encourage user interaction.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A method comprising:

providing a storage device that includes preference information and eligibility categories for a plurality of documents, wherein the eligibility categories are guidelines for determining which documents are allowed to be provided electronically and include content information, line of business information, security information, legal information, time sensitive information, and privacy information, and the preference information includes authorizing access of a customer to the document and a mode of electronic transmission that is favored by the customer for at least one of the plurality of documents;

searching the storage device for the preference information related to the customer and the eligibility categories related to a document included in the plurality of documents, where the preference information and the eligibility categories is previously populated information;

in response to finding the eligibility categories related to the document, determining whether the document is eligible to be provided electronically by analyzing the eligibility categories;

in response to finding the preference information and determining that the document is eligible, determining the customer is authorized to access the document and providing electronic access to the document and transmitting the document according to the preference information of the customer; and generating a reminder email to the customer when a pre-selected period of time has passed without the customer reviewing the transmitted document.

2. The method of claim 1, wherein providing electronic access to the document includes:

providing the document via a website.

3. The method of claim 2, wherein providing the document via a website includes:
   providing the document as an amendable document.

4. The method of claim 3, wherein the amendable document is in a non-image type format.

5. The method of claim 4, wherein the amendable document is a hyper text mark up language ("HTML") document.

6. The method of claim 3, wherein the amendable document is in an image type format.

7. The method of claim 6, wherein the amendable document is a portable document format ("PDF") document.

8. The method of claim 6, wherein the amendable document is a graphics interchange format ("GIF") document.

9. The method of claim 6, wherein the amendable document is a joint photographic experts group ("JPEG") document.

10. The method of claim 6, wherein the amendable document is a tagged image file format ("TIFF") document.

11. The method of claim 6, wherein the amendable document is a bitmap document.

12. The method of claim 6, wherein the amendable document is a portable network graphics ("PNG") document.

13. The method of claim 3, and comprising:
    receiving an electronic signature for the document from a user.

14. The method of claim 1, and comprising:
    providing an indication of whether the document was previously accessed.

15. The method of claim 14, wherein providing the indication includes:
    in response to determining that the document was previously accessed, providing the indication with a first color; and
    in response to determining that the document was not previously accessed, providing the indication with a second color.

16. The method of claim 1, wherein the preference information and the eligibility information are located in a single electronic data file in the storage device.

17. A computer system comprising:
    a storage device for storing preference information and eligibility categories for a plurality of documents, wherein the eligibility categories are guidelines for determining which documents are allowed to be provided electronically and include of content information, line of business information, security information, legal information, time sensitive information, and privacy information and the preference information includes authorizing access of a customer to the document and a mode of electronic transmission that is favored by the customer for at least one of the plurality of documents; and
    a processing unit coupled to the storage device for:
       searching the storage device for the preference information related to the customer and the eligibility categories associated with a document, included in the plurality of documents, where the preference information and the eligibility categories is previously populated information;
       in response to finding the eligibility categories associated with the document, determining whether the document is eligible to be provided electronically for electronic access by analyzing the eligibility categories;
       in response to finding the preference information and determining that the document is eligible, determining the customer is authorized to access the document and notifying a user that the document has been provided for electronic access and then providing the user electronic access to the document according to the preference information of the customer; and
       generating a reminder email to the customer when a pre-selected period of time has passed without the customer reviewing the transmitted document.

18. The system of claim 17, wherein providing electronic access to the document includes:
    providing the document via a website.

19. The system of claim 18, wherein providing the document via a website includes:
    providing the document as an amendable document.

20. The system of claim 19, wherein the amendable document is in a non-image type format.

21. The system of claim 20, wherein the amendable document is a hyper text mark up language ("HTML") document.

22. The system of claim 20, wherein the amendable document is in an image type format.

23. The system of claim 22, wherein the amendable document is a portable document format ("PDF") document.

24. The system of claim 22, wherein the amendable document is a graphics interchange format ("GIF") document.

25. The system of claim 22, wherein the amendable document is a joint photographic experts group ("JPEG") document.

26. The system of claim 22, wherein the amendable document is a tagged image file format ("TIFF") document.

27. The system of claim 22, wherein the amendable document is a bitmap document.

28. The system of claim 22, wherein the amendable document is a portable network graphics ("PNG") document.

29. The system of claim 19, wherein the processing unit is for:
    receiving an electronic signature for the document from the user.

30. The system of claim 17, wherein the processing unit is for:
    providing an indication of whether the document was previously accessed.

31. The system of claim 30, wherein providing the indication includes:
    in response to determining that the document was previously accessed, providing the indication with a first color; and
    in response to determining that the document was not previously accessed, providing the indication with a second color.

32. The system of claim 30, wherein the notifying the user that the document has been provided for electronic access comprises notifying the user with an email message.

33. An information handling system ("IHS") comprising:
    a storage device for storing preference information and eligibility categories for a plurality of documents, wherein the eligibility categories are guidelines for determining which documents are allowed to be provided electronically and include content information, line of business information, security information, legal information, time sensitive information, and privacy information, and the preference information includes authorizing access of a customer to the document and a mode of electronic transmission that is favored by the customer for at least one of the plurality of documents;
    an output device coupled to the storage device; and
    a processing unit coupled to the storage device for:
       searching the storage device for the preference information related to the customer and the eligibility categories related to a document included in the plurality of documents, where the preference information and the eligibility categories is previously populated information;

in response to finding the eligibility categories related to the document, determining whether the document is eligible to be provided electronically by analyzing the eligibility categories;

in response to finding the preference information and determining that the document is eligible, determining the customer is authorized to access the document and notifying the user that the document has been provided for electronic access and transmitting the document to the user according to the preference information of the customer; and generating a reminder email to the customer when a pre-selected period of time has passed without the customer reviewing the transmitted document.

* * * * *